(12) United States Patent
Barde et al.

(10) Patent No.: US 7,457,532 B2
(45) Date of Patent: Nov. 25, 2008

(54) SYSTEMS AND METHODS FOR RETRIEVING, VIEWING AND NAVIGATING DVD-BASED CONTENT

(75) Inventors: Sumedh N. Barde, Redmond, WA (US); Jonathan M. Cain, Seattle, WA (US); David Janecek, Woodinville, WA (US); John W. Terrell, Bothell, WA (US); Bradley S. Serbus, Seattle, WA (US); Christina Storm, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1075 days.

(21) Appl. No.: 10/105,065

(22) Filed: Mar. 22, 2002

(65) Prior Publication Data

US 2003/0180032 A1   Sep. 25, 2003

(51) Int. Cl.
  *H04N 5/00*  (2006.01)
  *H04N 5/93*  (2006.01)
  *H04N 5/91*  (2006.01)
  *H04N 7/00*  (2006.01)

(52) U.S. Cl. .................... 386/126; 386/55; 386/70; 386/82; 386/125; 386/105; 386/106

(58) Field of Classification Search ................. 386/105, 386/123, 124, 1, 45, 95, 55, 82, 106, 125–126, 386/69–70; 725/31, 37–39, 41, 44, 45, 47, 725/52, 55; 345/723, 760; 715/700, 723
See application file for complete search history.

(56) References Cited

U.S. PATENT DOCUMENTS

| | | | | |
|---|---|---|---|---|
| 5,995,101 A | * | 11/1999 | Clark et al. | 715/711 |
| 6,073,108 A | * | 6/2000 | Peterson | 705/8 |
| 6,452,609 B1 | * | 9/2002 | Katinsky et al. | 715/716 |
| 7,020,663 B2 | * | 3/2006 | Hay et al. | 707/104.1 |
| 2001/0037430 A1 | * | 11/2001 | Heo | 711/112 |
| 2003/0005442 A1 | * | 1/2003 | Brodersen et al. | 725/44 |
| 2003/0152366 A1 | * | 8/2003 | Kanazawa et al. | 386/69 |

OTHER PUBLICATIONS http://www.digital-digest.com/articles/windvd_page3.html.*

* cited by examiner

*Primary Examiner*—Thai Tran
*Assistant Examiner*—Daquan Zhao (57) ABSTRACT

Methods, systems and architectures for enhancing a user's DVD experience are described. In one embodiment, the hierarchical structure (e.g. titles and chapters) of a DVD is ascertained and a corresponding playlist structure shell is built. Metadata associated with the DVD is acquired and used to populate the playlist structure shell. In some embodiments, the metadata can be acquired from a metadata source external to the DVD and/or remote from a computing device on which the DYD is being played. Remote locations can include, without limitation, those that are network- or Internet-accessible. Once the playlist structure shell is populated, it can be used to render a playlist associated with the DVD's video in an area of a user interface display.

47 Claims, 6 Drawing Sheets

SYSTEMS AND METHODS FOR RETRIEVING, VIEWING AND NAVIGATING DVD-BASED CONTENT

TECHNICAL FIELD

This invention relates generally to DVD systems and methods and, more particularly, to methods and systems for enhancing a user's DVD experience.

BACKGROUND

DVDs are information storage devices used for storing prerecorded audio information, movies and computer software. The storage and playback mechanism used in DVD players uses laser technology that permits data to be stored as a pattern of pits formed in a metallic substrate. The pit patterns form digital words and can be read by shining a laser beam on the disc surface and detecting the reflected beam. The information storage capacity of a typical DVD is very large and there are a variety of capacities which depend on the technology used to manufacture the discs. This high information storage capacity makes DVDs suitable for storing not only audio information, but also video information and large amounts of computer data as well.

DVD players have various features, such as the ability to play selections in any order desired and the ability to read information from any point on the disc. DVDs can also store information in several formats. For example, DVDs which are used to store video information may use various known information compression algorithms, such as MPEG-2 for video compression/decompression. A DVD can also include high fidelity sound data. In addition, a DVD can also store uncompressed linear pulse code modulated data streams which have sample rates between 48-90 kHz and are sampled at 16 or 24 bits. Still other DVD versions can store digital data for computer use, and the data may also be compressed on these discs.

One popular use of DVDs is to store movies along with other information that a user can view. Typically, a movie is divided into so-called titles and chapters. Each title is associated with some aspect of a movie and the individual chapters within a title are likewise associated with their respective titles. For example, one title might be associated with an FBI warning. Another title might be associated with the movie content itself and can have many associated chapters each of which are individually associated with particular portions of the movie content. Yet another title might be associated with the wide screen version of the movie and can have, itself, several associated chapters. Another title might be associated with the movie's trailers.

DVD players typically provide the user or viewer, via a user interface, the ability to view only very basic information associated with a DVD's chapters and titles. This information has typically not been descriptive information pertaining to the chapters and titles, but rather only chapter and title numbers.

Past user interfaces have also been very simplistic in their design and have provided only primitive and very basic navigation commands and capabilities. These past systems have tended to rely on the DVD's own and often very cryptic menu system which provides no direct access to the DVD's physical structure.

Additionally, the manner in which chapter and title data is provided for the user often makes for a disjointed user experience. For example, in many systems there is a menu button that is presented to the user. During the presentation of a movie, the user can click on the menu button to access the DVD's menu. When the menu is accessed, the user is typically taken out of the context of the movie (i.e. the movie disappears) and a menu appears for the user. The user must then further enter the layered structure of the menu to get at a particular chapter within a particular title. Many times, though, only the chapter and title numbers are displayed. Thus, it is incumbent on the user to know exactly where they want to go. Needless to say, this is not the best user experience, particularly for those users who are not acquainted with the particular structure of the DVD's titles and chapters.

Accordingly, this invention arose out of concerns associated with providing systems and methods that can greatly enhance a user's DVD experience.

SUMMARY

Methods and systems for enhancing a user's DVD experience are described.

In one embodiment, the physical structure (e.g. titles and chapters) of a DVD is ascertained and a playlist structure shell that represents the DVD's physical structure is built. Metadata associated with the DVD is acquired and used to populate the playlist structure shell. In some embodiments, the metadata can be acquired from a metadata source external to the DVD and/or remote from a computing device on which the DVD is being played. Remote locations can include, without limitation, those that are network- or Internet-accessible. Once the playlist structure shell is populated, it can be used to render a playlist associated with the DVD's video in an area of a user interface display.

In some embodiments, a DVD's video can be rendered in a first area of the user interface display and the playlist can be rendered in a second area of the user interface display during at least some of the time that the DVD's video is rendered in the first area.

One embodiment comprises an architecture for enhancing a user's DVD experience. The architecture comprises a DVD navigator that is configured to ascertain a DVD's titles and chapters and a user interface builder communicatively linked with the DVD navigator and configured to build a hierarchical playlist structure shell that represents the DVD's titles and chapters. The user interface builder can populate the hierarchical playlist structure shell with metadata that it can acquire from a metadata source which can, in some embodiments, be external to the DVD.

DETAILED DESCRIPTION

Overview

The various embodiments described below are directed to greatly enhancing the user's DVD experience. In some embodiments, this is done by providing the user with a hierarchical visual representation of the entire physical content or structure (e.g. the titles and associated chapters) of the DVD in a single, unified view. This unified view can, in some implementations, be accessed with a single user input such as a mouse click. Navigation can be greatly streamlined and simplified via the unified view. Additionally, the user's experience can be greatly enhanced through the provision of metadata that is provided to compliment the DVD's title and chapter information. In some embodiments, this metadata can be retrieved from a remote location such as a network-accessible server or web service and then presented to the user for their enjoyment and use.

Additional embodiments can provide the user with real-time visual feedback of their current hierarchical playback location. One particularly advantageous feature of one or more of the described embodiments is that the single unified view can be presented to the user without taking the user out of the context of the movie that they are currently viewing. That is, the unified view (termed the "playlist" in some examples) can be presented right along side the movie presentation.

All of these features can combine for a robust, flexible user DVD experience, as will become apparent below.

Exemplary Computer Environment

Figure 1:
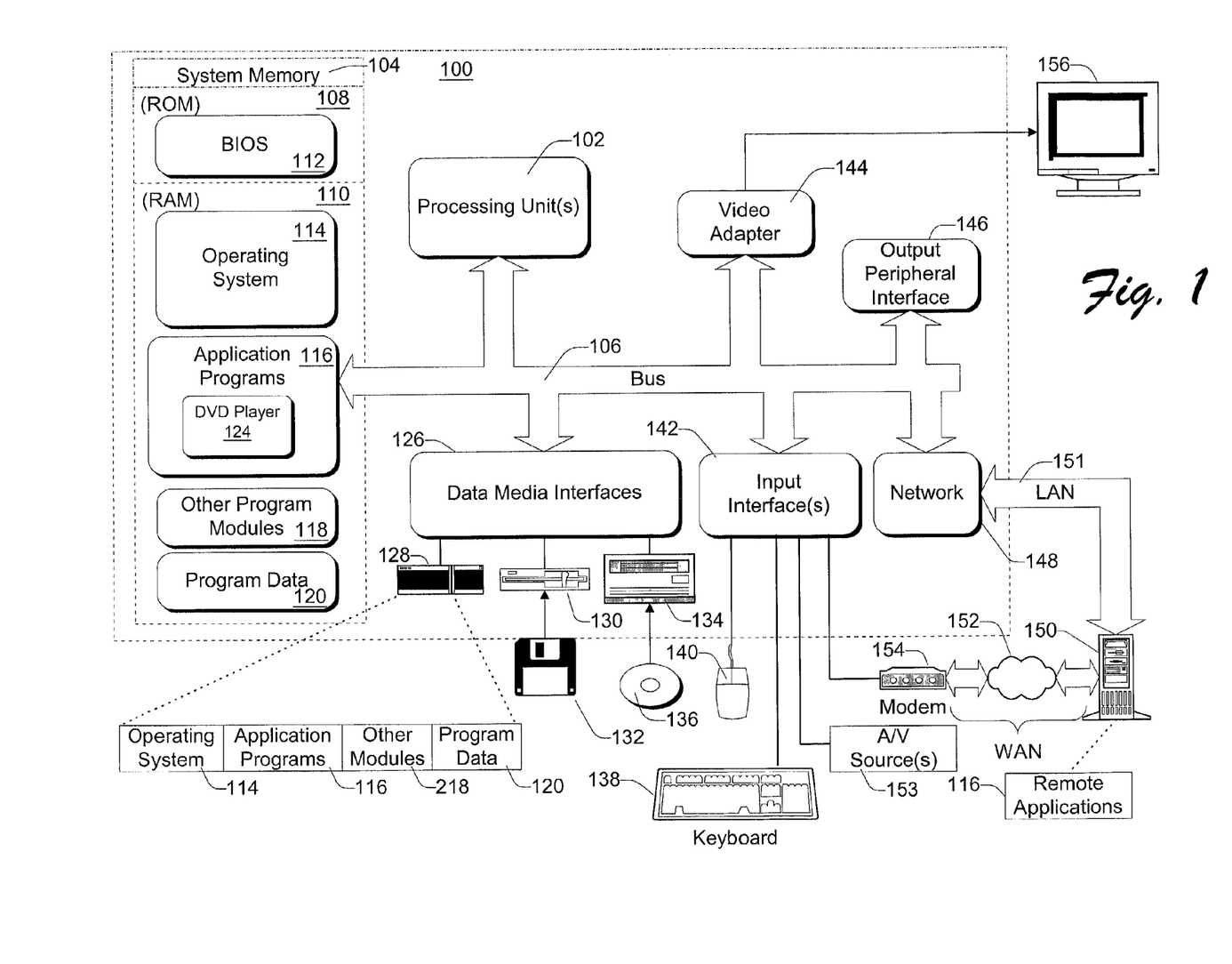
FIG. 1 is a block diagram of an exemplary computer system that can be utilized to implement one or more embodiments.

FIG. 1 illustrates an example of a suitable computing environment 100 on which the system and related methods described below can be implemented.

It is to be appreciated that computing environment 100 is only one example of a suitable computing environment and is not intended to suggest any limitation as to the scope of use or functionality of the media processing system. Neither should the computing environment 100 be interpreted as having any dependency or requirement relating to any one or combination of components illustrated in the exemplary computing environment 100.

The inventive techniques can be operational with numerous other general purpose or special purpose computing system environments, configurations, or devices. Examples of well known computing systems, environments, devices and/or configurations that may be suitable for use with the described techniques include, but are not limited to, personal computers, server computers, thin clients, thick clients, handheld or laptop devices, multiprocessor systems, microprocessor-based systems, set top boxes, programmable consumer electronics, network PCs, minicomputers, mainframe computers, distributed computing environments and the like.

In certain implementations, the system and related methods may well be described in the general context of computer-executable instructions, such as program modules, being executed by a computer. Generally, program modules include routines, programs, objects, components, data structures, etc. that perform particular tasks or implement particular abstract data types. The inventive techniques may also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 1 computing system 100 is shown comprising one or more processors or processing units 102, a system memory 104, and a bus 106 that couples various system components including the system memory 104 to the processor 102.

Bus 106 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 100 typically includes a variety of computer readable media. Such media may be any available media that is locally and/or remotely accessible by computer 100, and it includes both volatile and non-volatile media, removable and non-removable media.

In FIG. 1, the system memory 104 includes computer readable media in the form of volatile, such as random access memory (RAM) 110, and/or non-volatile memory, such as read only memory (ROM) 108. A basic input/output system (BIOS) 112, containing the basic routines that help to transfer information between elements within computer 100, such as during start-up, is stored in ROM 108. RAM 110 typically contains data and/or program modules that are immediately accessible to and/or presently operated on by processing unit(s) 102.

Computer 100 may further include other removable/non-removable, volatile/non-volatile computer storage media. By way of example only, FIG. 1 illustrates a hard disk drive 128 for reading from and writing to a non-removable, non-volatile magnetic media (not shown and typically called a "hard drive"), a magnetic disk drive 130 for reading from and writing to a removable, non-volatile magnetic disk 132 (e.g., a "floppy disk"), and an optical disk drive 134 for reading from or writing to a removable, non-volatile optical disk 136 such as a CD-ROM, DVD-ROM or other optical media. The hard disk drive 128, magnetic disk drive 130, and optical disk drive 134 are each connected to bus 106 by one or more interfaces 126.

The drives and their associated computer-readable media provide nonvolatile storage of computer readable instructions, data structures, program modules, and other data for computer 100. Although the exemplary environment described herein employs a hard disk 128, a removable magnetic disk 132 and a removable optical disk 136, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 128, magnetic disk 132, optical disk 136, ROM 108, or RAM 110, including, by way of example, and not limitation, an operating system 114, one or more application programs 116 (e.g., DVD player application 124), other program modules 118, and program data 120.

A user may enter commands and information into computer 100 through input devices such as keyboard 138 and pointing device 140 (such as a "mouse"). Other input devices may include a audio/video input device(s) 153, a microphone, joystick, game pad, satellite dish, serial port, scanner, or the like (not shown). These and other input devices are connected to the processing unit(s) 102 through input interface(s) 142 that is coupled to bus 106, but may be connected by other interface and bus structures, such as a parallel port, game port, or a universal serial bus (USB).

A monitor 156 or other type of display device is also connected to bus 106 via an interface, such as a video adapter 144. In addition to the monitor, personal computers typically include other peripheral output devices (not shown), such as speakers and printers, which may be connected through output peripheral interface 146.

Computer 100 may operate in a networked environment using logical connections to one or more remote computers, such as a remote computer 150. Remote computer 150 may include many or all of the elements and features described herein relative to computer.

As shown in FIG. 1, computing system 100 is communicatively coupled to remote devices (e.g., remote computer 150) through a local area network (LAN) 151 and a general wide area network (WAN) 152. Such networking environments are commonplace in offices, enterprise-wide computer networks, intranets, and the Internet.

When used in a LAN networking environment, the computer 100 is connected to LAN 151 through a suitable network interface or adapter 148. When used in a WAN networking environment, the computer 100 typically includes a modem 154 or other means for establishing communications over the WAN 152. The modem 154, which may be internal or external, may be connected to the system bus 106 via the user input interface 142, or other appropriate mechanism.

In a networked environment, program modules depicted relative to the personal computer 100, or portions thereof, may be stored in a remote memory storage device. By way of example, and not limitation, FIG. 1 illustrates remote application programs 116 as residing on a memory device of remote computer 150. It will be appreciated that the network connections shown and described are exemplary and other means of establishing a communications link between the computers may be used.

Exemplary Hardware/Software Architecture

Figure 2:
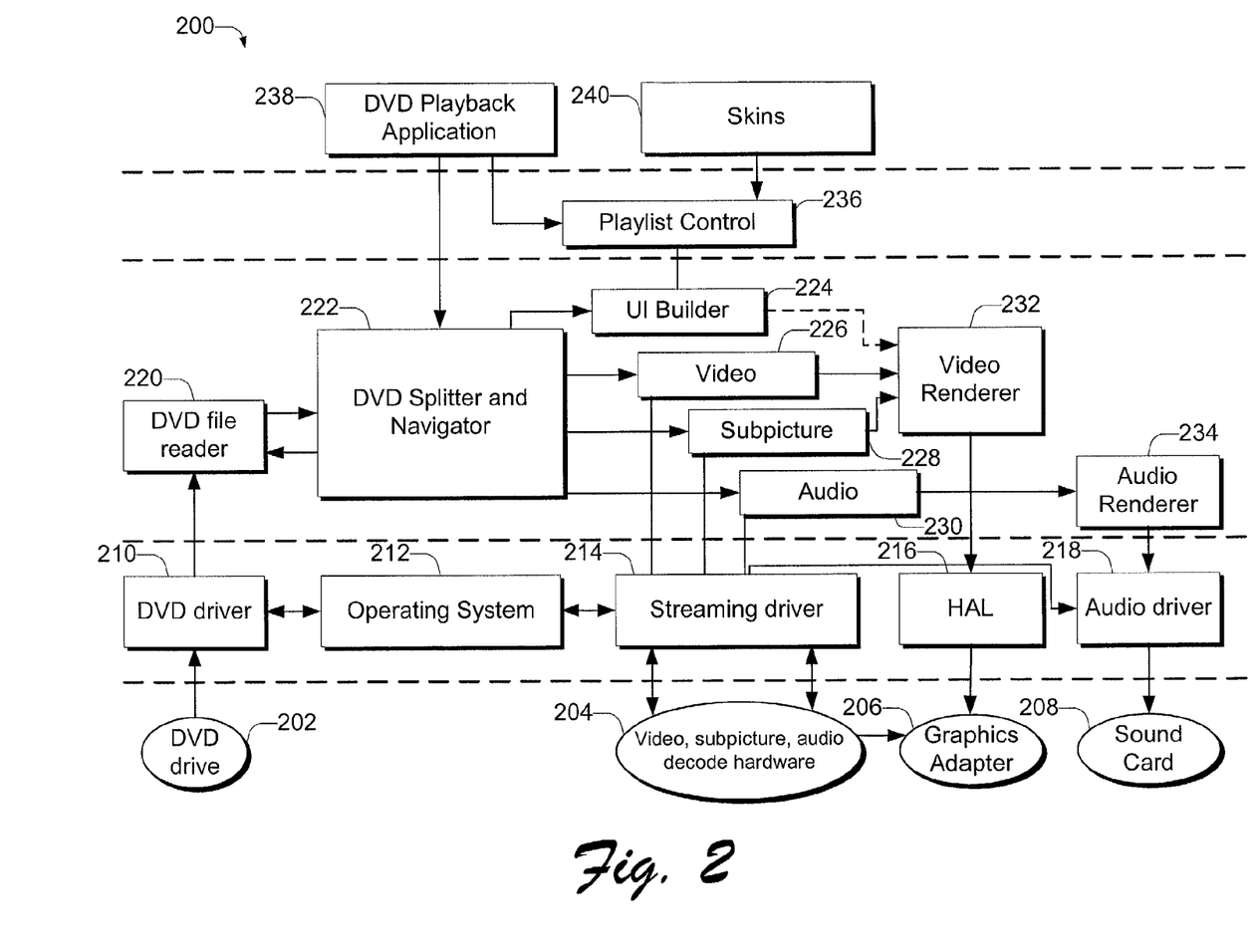
FIG. 2 is a block diagram of an exemplary hardware/software architecture that can be utilized to implement one or more embodiments.

FIG. 2 shows an exemplary hardware/software architecture generally at 200 that can be utilized to implement one or more of the embodiments described in this document. It is to be appreciated that the illustrated architecture constitutes but one exemplary architecture and is not intended to limit the claimed subject matter to any one particular architecture or type of architecture.

Architecture 200 comprises a hardware layer that includes various types of hardware that can be utilized to interact with and read DVDs, as well as present the content on the DVD for a user. Specifically, a DVD drive 202 receives a DVD and operates to read the data that is stored on the DVD. A component 204 can include the hardware that is necessary to decode the video, subpicture and audio content. A graphics adapter 206 can operate to facilitate presentation of the graphical content and a sound card 208 can operate to facilitate presentation of the sound content.

Above the hardware layer is a software or firmware layer that can include the various drivers such as a DVD driver 210, streaming driver 214 and an audio driver 218. Additionally, this layer can include the operating system 212 and a hardware abstraction layer or "HAL" 216 that can assist in transferring decoded video streams to the display card or graphics adapter 206.

The next layer typically includes a DVD file reader 220 that reads files from the DVD. A DVD splitter and navigator 222 is coupled with the DVD file reader 220 and performs a couple of different functions. First, the navigator reads the DVD content and parses the DVD structure such as the title and chapter data. Second, the navigator parses the DVD content, i.e. audio, video, and if present, subpicture content.

A UI builder 224 is provided and is associated with the DVD splitter and navigator 222. The UI builder 224 builds a blank or shell playlist structure based on the DVD structure ascertained by the navigator 222. This entails, in this example, building a hierarchical structure of media objects associated with the chapter and title information. This is discussed in more detail below.

In one embodiment, the user interface builder is implemented as two separate components that can be available to a media playing application. A first of the components can define and build the playlist. The playlist can be accessed programmatically by clients of the media playing application. In one implementation, the playlist is exposed as a COM object so that it can be programmatically accessed by C++ as well as script in various skins and web pages. A second of the components can comprise a playlist control that accesses the playlist via C++ and exposes a user interface widget that can be incorporated in any skin.

Additional components such as video component 226, subpicture component 228 and audio component 230 further process the DVD content so that it can be rendered. As such, a video renderer 232 receives and renders data from the video and subpicture components 226, 228 respectively. Likewise, an audio renderer 234 receives and renders data from the audio component 230.

A playlist control 236 is provided and comprises software that is programmed to display and present a user interface (UI) to the user under the influence of a DVD playback application 238 and skin software 240. The DVD playback software can comprise any suitable DVD player application. The skin software is software that defines and presents skins that can be incorporated into the UI that is presented to the user. Exemplary skin software and architectures are shown and described in the following U.S. Patent Applications, the disclosures of which are incorporated by reference herein: application Ser. No. 09/817,902 entitled "Methods and Systems for Synchronizing Visualizations with Audio Streams", and application Ser. No. 09/817,901 entitled "Methods, Systems and Media Players for Rendering Different Media Types", both of which were filed on Mar. 26, 2001.

Exemplary UI Builder Implementation

Figure 3:
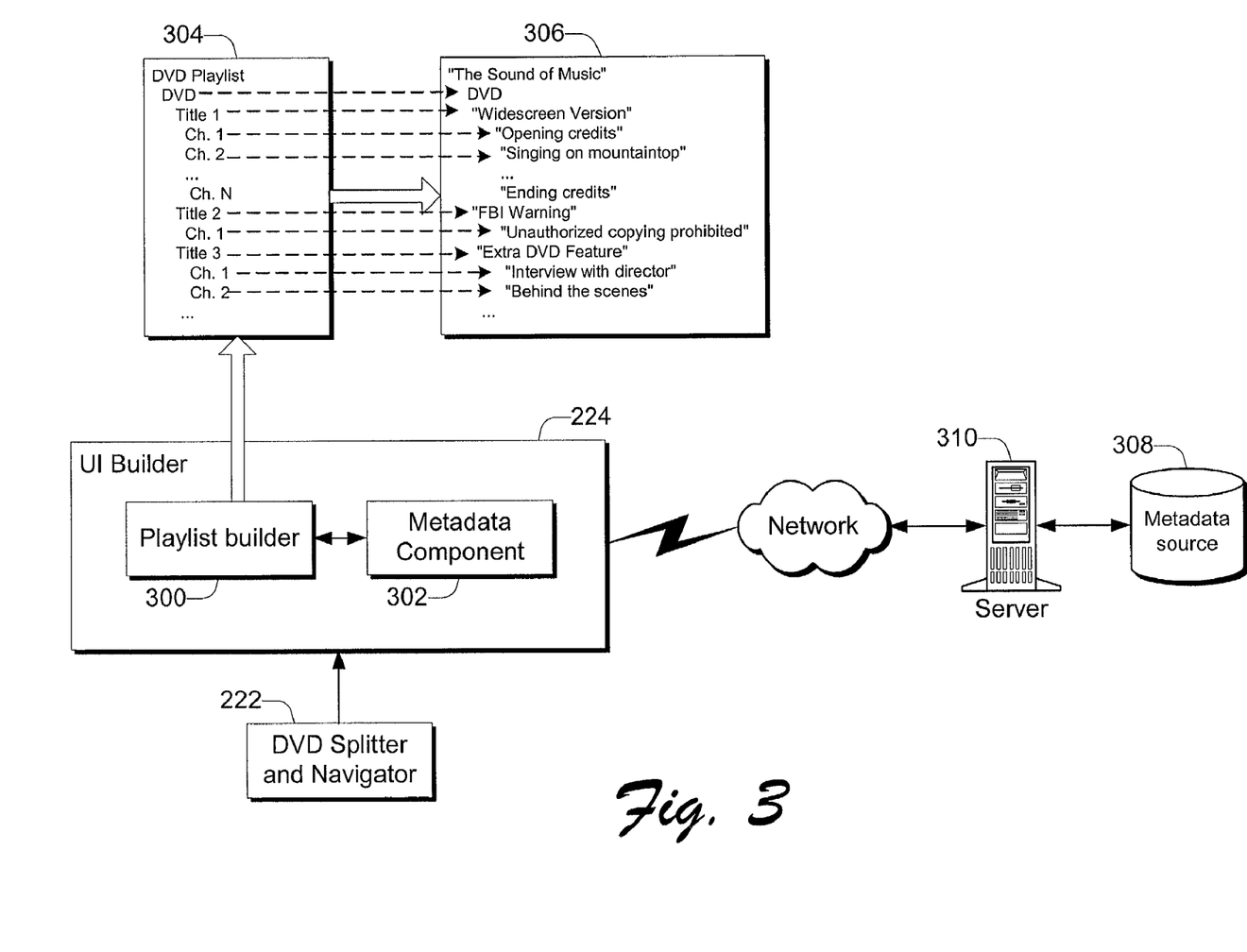
FIG. 3 is a block diagram illustrating aspects of an architecture that can be utilized to implement one or more embodiments.

FIG. 3 shows an exemplary implementation of UI builder 224 in accordance with one embodiment. Although certain components about to described are illustrated as comprising part of the UI builder, such is not necessary. Accordingly, these components can comprise separate components.

In this particular example, UI builder 224 communicates with the DVD navigator 222 and determines how many titles and associated chapters there are on a particular DVD of interest. The UI builder can identify the DVD by virtue of a unique ID that is associated with the DVD. The unique ID can comprise any suitable identifier. In one implementation, the unique ID is a 64-bit identifier that is assigned to the DVD. The assignment of the unique ID can take place in any suitable way. For example, the identifier can be assigned when the DVD is created. Alternately, the assignment of the identifier can be done at some time after the DVD is created. In one implementation, the identifier can be assigned by a separate entity that is not associated with the DVD creation process. For example, a third party service can assign the identifier and can use the identifier for purposes that will become evident below. Alternately, the software that processes the DVD data on the user's computing device can assign or otherwise compute the identifier. This identifier is desirably the same across all DVDs that have the same content (e.g. the "When Harry Met Sally" DVD has the same unique ID).

UI builder 224 comprises a playlist builder 300 that uses the information ascertained from the DVD navigator 222 to build a hierarchical blank or shell playlist structure comprising various media objects. An exemplary blank or shell playlist structure is shown at 304 and represents the physical structure of the DVD. Here, the playlist structure 304 comprises a playlist object (designated "DVD Playlist") that includes a number of subordinate objects. Here, for example, the playlist object is composed of a number of title objects (designated "Title 1" and so on) each of which can have one or more chapter objects (designated "Ch. 1" and so on). In this particular implementation, an additional object is provided and resides at the root level of the playlist object and is designated "DVD" in the structure illustrated at 304. This object represents the beginning of the DVD. The behavior of the DVD object depends on how the DVD was authored. For example, on some DVDs, activating this object will start playback of the disc's content (i.e. the movie). Yet on other DVDs, activating the DVD object will display the disc's built-in menu system.

In the illustrated example, the various objects are implemented as COM objects, although such need not be the case. Other types of objects can be utilized to implement the various objects in the described hierarchical structure.

Notice in this particular example, at this point in the playlist construction process, there are no DVD-specific names associated with the various media objects. Rather, the objects simply represent their particular locations in the overall hierarchical structure that has been constructed by playlist builder 300. That is, the media objects can be thought of as unpopulated metadata markers.

UI builder 224 also includes, in this example, a metadata component 302 that is configured to populate playlist structure 304. In the illustrated and described embodiment, the metadata component 302 is responsible for communicating with a remote location that serves as a source of the metadata for a particular playlist structure.

Notice that in FIG. 3 a metadata source 308 is provided remote from the computing device on which the DVD has been or is being viewed. Metadata source 308 can contain metadata for many different DVDs. The metadata source can contain many different types of data for a particular DVD. For example, the metadata can comprise title and chapter names and durations. Additionally, the metadata can comprise various quality ratings, reviews and the like. Further, the metadata can comprise links (such as hyperlinks) that can be used to access additional information, and HTML pages. Needless to say, there are simply many different types of metadata that can be maintained and provided when requested.

In this particular example, a server 310 is provided and is accessible via a network (not specifically designated). The server can also be considered as comprising part of the metadata source. Any suitable network can be used. In one particular implementation, the network comprises the Internet. Server 310 is configured to access the metadata source 308 to retrieve metadata for a particular DVD when so requested.

In this particular example, metadata component 302 uses the DVD's unique ID and incorporates the ID into a URL that is sent to server 310. The server accesses the DVD's metadata using the ID as an index into the metadata. Server 310 then bundles the metadata and transmits it back over the network to the UI builder. Any suitable structure can be used to bundle and send the metadata back to the UI builder. In one particular implementation, the metadata is bundled as an XML file and sent to the UI builder.

Once received, the UI builder 224 processes the metadata and uses it to populate the blank playlist structure. For example, where the metadata is returned as an XML file, the UI builder parses the XML and maps the metadata into the blank playlist so that it occupies the appropriate location in the playlist.

In the FIG. 3 example, a populated playlist is shown at 306. Notice that there is a correspondence between the blank playlist structure and the populated playlist, as indicated by the dashed arrows extending between the blank playlist structure 304 and the populated playlist 306.

Figure 4:
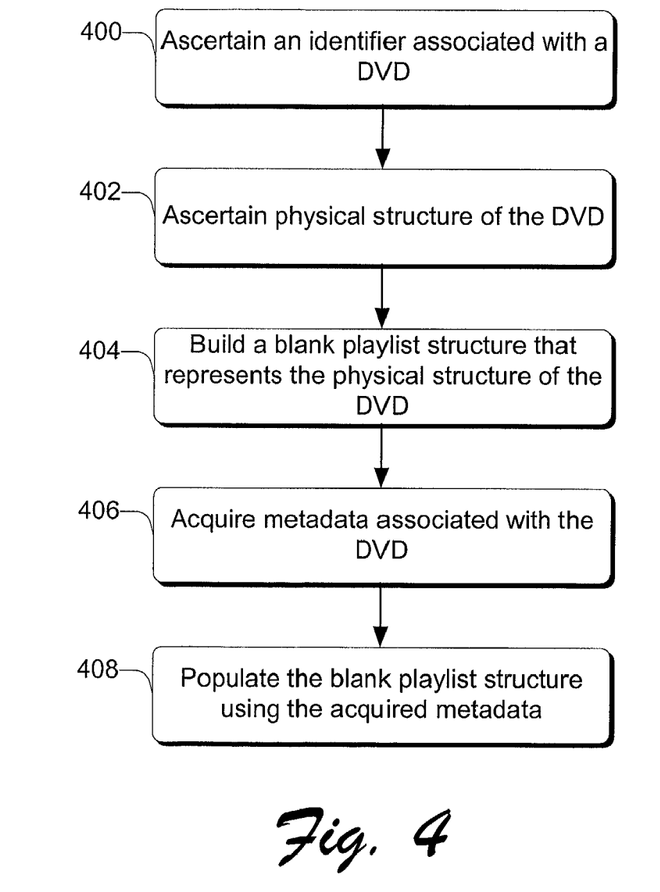
FIG. 4 is a flow diagram that describes steps in a method in accordance with one embodiment.

FIG. 4 is a flow diagram that describes steps in a method in accordance with one embodiment. The method can be implemented in connection with any suitable hardware, software, firmware or combination thereof. In but one example, the method can be implemented in connection with the systems shown in FIGS. 2 and 3 and described above.

Step 400 ascertains an identifier associated with a DVD. This step can be implemented when the DVD is loaded into a DVD drive. Examples of identifiers are given above. Step 402 ascertains the physical structure of the DVD. This step can be implemented by ascertaining, among other information, the number of titles and chapters on the DVD, as well as the relationship between the titles and chapters. For example, this step can ascertain how many chapters fall under particular titles. One specific architecture that can accomplish this task was shown and described in connection with FIG. 3.

Step 404 then builds a blank or shell playlist structure that represents the physical structure of the DVD. In the illustrated example above, this step is implemented by defining a hierarchical structure comprising media objects that represent the individual titles and their subordinate chapters. Step 406 acquires metadata associated with the DVD. This step can be implemented in any suitable way. For example, the metadata can be acquired from a remote metadata source as noted in FIG. 3. The metadata can also be acquired, at least in part, locally on the computing device on which the DVD is or has been played. For example, in some cases, when a user plays a DVD, their particular computing device may not have access to the remote metadata source. Consider the case, for example, where the remote metadata source is accessible via the Internet and the user happens to play the DVD for the first time on their laptop computer when they are on an airplane. In this scenario, the metadata may not be able to be immediately acquired because of the lack of Internet connectivity on the airplane. The system can, however, note that metadata needs to be acquired for this DVD. Accordingly, the next time that the user establishes Internet connectivity with their laptop computer, the system can automatically access the metadata source and acquire the appropriate metadata. The metadata can then be cached and used the next time the user plays the DVD. This can all be done in the background without any knowledge on the user's part.

Step 408 then populates the blank playlist structure using the acquired metadata. Once the blank playlist structure is populated, it can be presented to the user via a suitable user interface or UI.

Exemplary Mapping Process

In some embodiments, the blank playlist structure is populated by mapping the acquired metadata into the playlist structure. This mapping can take place using any suitable technique. For example, in one case, the title and chapter metadata can be mapped by virtue of the number of titles and chapters. That is, if there are three titles only one of which has 35 chapters, then when the metadata is received and processed, if the metadata has one title with 35 chapters, then the metadata is mapped to the particular blank playlist structure that corresponds to the title having 35 chapters. If there is no direct one-to-one mapping correspondence, then various heuristics can attempt to ascertain the closest match. For example, if there are four titles three of which have under ten chapters and only one of which has 34 chapters, then the metadata corresponding to the title with 35 chapters can be mapped to the blank playlist structure that corresponds to the title having 34 chapters.

In some embodiments, if metadata is incorrectly mapped to a particular portion of the blank playlist structure, then the mapping can be fixed by giving the user the opportunity to correct the mapping. This can be done by presenting a UI component that enables the user to remap the metadata. If, over time, a sufficient number of users remap the metadata then, on the server side, an adjustment can be made so that the metadata is re-mapped to the appropriate title or chapter.

Exemplary User Interface Implementation and Features

In some embodiments, the playlist data and structure can be exposed to other applications so that the applications can manipulate the data and structure. For example, various applications or skins can display the playlist metadata anywhere on the user's display. Exemplary systems that can be utilized to present unique and interesting skins for DVD players are described in the patent applications incorporated by reference above.

Figure 5:
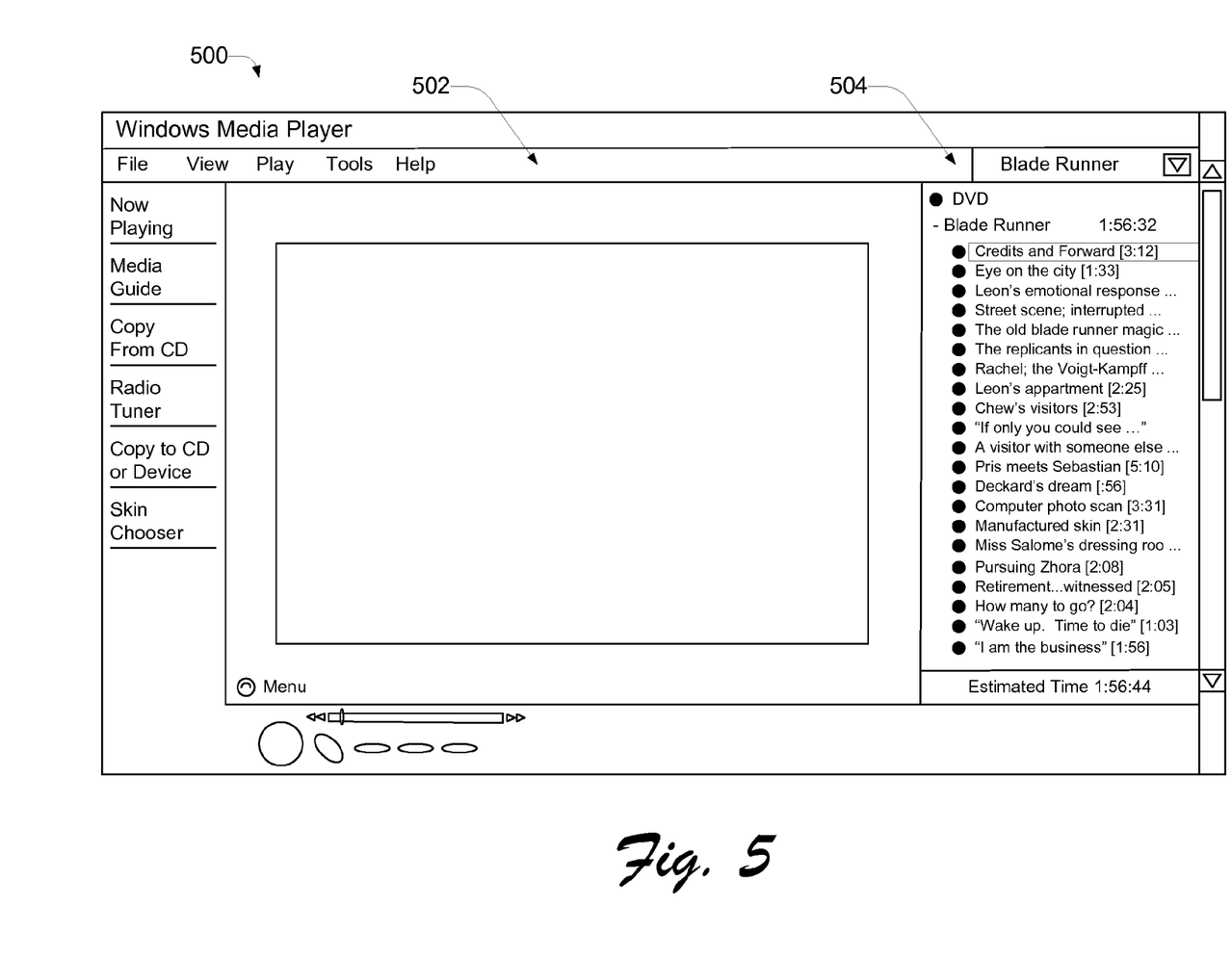
FIG. 5 illustrates an exemplary user interface in accordance with one embodiment.

FIG. 5 shows an exemplary implementation of a user interface generally at 500. User interface 500 constitutes a interface that has been rendered using the various components described above. In this particular implementation, the user interface was rendered using the Windows Media Player's skin architecture, aspects of which are described in the patent applications incorporated by reference above. That architecture uses XML, various graphics files and a JScript scripting engine to render the user interface.

Control of the DVD playback and retrieval of the metadata takes place through the public interfaces that are exposed to the scripting environment in the Windows Media Player skins. The playlist is populated with the data representing the playlist and is displayed to the right of the video. That is, in this example, a pre-determined display area 502 can be used to display the video of the DVD movie. Another pre-determined area 504 can be used to display the playlist data for the user. The user can, via the interface, click on particular titles and chapters so that the video can be automatically advanced. In one implementation, each of the titles and chapters in the playlist is associated with a URL that uniquely identifies that title/chapter. For example, the URL "wmpdvd://E/2/4" means chapter 4 of title 2 of the disc in drive E. This URL can be mapped to the title/chapter number when a user clicks on a certain entry in the playlist in order to advance the video to the appropriate point.

Display of the playlist data can take place in a normal mode where the video is concurrently displayed for the user. Alternately, the playlist data can be displayed in a full screen mode in which the video is not concurrently displayed for the user. In addition, the user can be given the choice of turning the playlist display on or off.

When the playlist data is displayed, as in FIG. 5, the user can, via a single click, access the chapter and title metadata without having to leave the context of the movie. This constitutes a noteworthy departure from the prior approaches described in the "Background" section above.

In addition, in some implementations a "tool tip" can be provided such that when the user "hovers" (via their mouse) over any of the items in the playlist, additional information pops up and is displayed for the user.

One interesting feature in this particular implementation is that the displayed playlist is expandable. For example, the playlist contains individual items (such as titles and chapters) that can appear initially in an unexpanded state. The items can then be expanded, when appropriate, to expose additional subordinate items, e.g. the individual chapters under a title. As an example, the user can explicitly click on a title to expose its chapters. Alternately or additionally, the playlist can automatically expand. For example, as playback of the DVD occurs and extends into a particular chapter of a new title, the title can automatically expand to display the chapters underneath that title. The techniques that can be utilized to expand the various portions of the displayed playlist are known techniques that will be understood by those of skill in the art. Accordingly, for the sake of brevity, such techniques are not described in additional detail here.

Another interesting implementation feature in this example pertains to the visually highlighting of the various portions of the playlist that correspond to currently running content. That is, as the DVD is played back, a highlight mode can visually highlight the corresponding title and chapter so that the user immediately knows their context within the playlist. This can enhance the user's navigation of the playlist by providing a point of reference from which to navigate.

A further implementation feature in this example pertains to the manner in which the playlist and playlist controls can be exposed to the user. Specifically, the playlist and its controls can be configured to automatically slide on and off the UI. That is, if the user does not engage the playlist for a defined period of time, there is a mode in which the UI transitions to full screen video, with no display of the playlist. If the mouse is then engaged by the user, and if the appropriate mode is selected, the playlist will then automatically slide onto the screen or otherwise appear in its associated area of the display. This is implemented in the software that manages the full screen display by watching the mouse and running a timer on the mouse.

Exemplary Method

Figure 6:
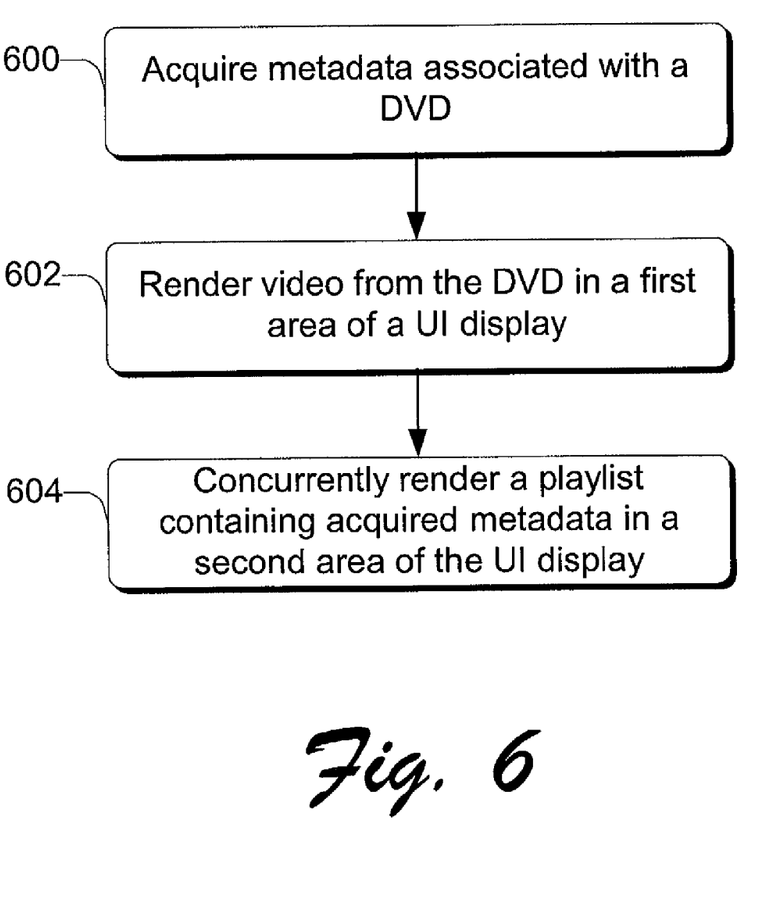
FIG. 6 is a flow diagram that describes steps in a method in accordance with one embodiment.

FIG. 6 is a flow diagram that describes steps in a method in accordance with one embodiment. The method can be implemented in connection with any suitable hardware, software, firmware or combination thereof. In but one example, the method can be implemented in connection with the systems shown in FIGS. 2 and 3 and described above.

Step 600 acquires metadata associated with a DVD. This step can be accomplished in any suitable way. Examples of how this can be done are described in connection with step 406 in FIG. 4. Step 602 renders video from the DVD in a first area of a user interface (UI) display. An exemplary UI is shown and described in connection with FIG. 5. Implicit in this step can also be the rendering of any associated audio that accompanies the video. Step 604 concurrently renders a playlist containing acquired metadata in a second area of the UI display. An exemplary playlist is shown and described in connection with FIG. 5.

CONCLUSION

The above-described systems and methods can greatly enhance a user's DVD experience in a number of ways. Various embodiments can provide an interface that is flexible and easily assimilated by the user. This can be particularly advantageous to users who are not familiar with DVD technology. Additionally, in some embodiments, direct access to the physical structure of the DVD can enable presentation of a robust collection of metadata that is associated with the DVDs. The hierarchical visual representation of the DVD's physical structure (e.g. titles and chapters) in a single unified view can not only greatly facilitate the user's navigation experience, but can increase the user's access to useful and interesting information pertaining to their DVD without interrupting the user's viewing experience. Additional embodiments impart flexibility to the DVD experience by providing different modes (e.g. full screen and normal modes) for viewing the DVD's video and associated playlist.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
    ascertaining a DVD's predefined hierarchical structure when the DVD is loaded and played on a DVD-playing device, including determining how many titles and chapters the DVD has, wherein said predefined hierarchical structure has been previously authored;
    building a blank playlist structure shell that represents the DVD's hierarchical structure, the blank playlist structure shell including objects that represent individual titles and any chapters that are subordinate to the individual titles;
    acquiring metadata associated with the DVD; and
    populating the blank playlist structure shell with the metadata, wherein the metadata includes data other than title and chapter information, and wherein populating comprises mapping the metadata into the blank playlist structure shell.

2. The method of claim 1, wherein the act of ascertaining further comprises determining a relationship between the titles and chapters.

3. The method of claim 1, wherein the act of populating comprises mapping the metadata into the playlist structure shell based on the number of DVD chapters.

4. The method of claim 1, wherein the act of acquiring comprises acquiring the metadata from a remote metadata source.

5. The method of claim 1, wherein the act of acquiring comprises, at least in part, acquiring the metadata from a local metadata source.

6. The method of claim 1, wherein the act of acquiring comprises determining whether a computing device on which a user is playing the DVD has network access and, if not, waiting until network access is established and then acquiring the metadata.

7. The method of claim 1 further comprising caching metadata for future use.

8. One or more computer-readable media having computer-readable instructions thereon which, when executed by one or more computing devices, cause the computing devices to implement the method of claim 1.

9. A computing device embodying the computer-readable media of claim 8.

10. A DVD-playing device configured to:
    ascertain a DVD's predefined hierarchical structure when the DVD is loaded and played on the DVD-playing device, including determining how many titles and chapters the DVD has, wherein said predefined hierarchical structure has been previously authored;
    build a blank playlist structure shell that represents the DVD's hierarchical structure, the blank playlist structure shell including objects that represent individual titles and any chapters that are subordinate to the individual titles;
    acquire metadata associated with the DVD from a source external to the DVD; and
    populate the blank playlist structure shell with the metadata by mapping the metadata into the blank playlist structure shell, wherein the metadata includes data other than title and chapter information.

11. The DVD-playing device of claim 10, wherein the device ascertains a relationship between the titles and chapters.

12. A method comprising:
    ascertaining a DVD's preexisting hierarchical structure when the DVD is loaded and played on a DVD-playing device by determining, at least in part, how many titles and chapters the DVD has, wherein said preexisting hierarchical structure has been previously authored;
    building a blank playlist structure shell that represents the DVD's hierarchical structure;
    acquiring metadata associated with the DVD from a network-accessible metadata source; and
    populating the blank playlist structure shell with the metadata, wherein the metadata includes data other than title and chapter information, and wherein populating comprises mapping the metadata into the blank playlist structure shell.

13. The method of claim 12, wherein the network-accessible metadata source comprises an Internet-accessible metadata source.

14. The method of claim 12, wherein the act of ascertaining further comprises determining a relationship between the titles and chapters.

15. The method of claim 14, wherein the act of building comprises defining a hierarchical structure comprising media objects that represent individual titles and any chapters that are subordinate to the individual titles.

16. The method of claim 12, wherein the act of acquiring comprises determining whether a computing device on which a user is playing the DVD has network access and, if not, waiting until network access is established and then acquiring the metadata.

17. The method of claim 12 further comprising caching metadata for future use.

18. One or more computer-readable media having computer-readable instructions thereon which, when executed by one or more computing devices, cause the computing devices to implement the method of claim 12.

19. A DVD-playing device embodying the computer-readable media of claim 18.

20. A method comprising:
    ascertaining an identifier that is associated with a DVD when the DVD is loaded and played on a DVD-playing device;
    ascertaining a DVD's predefined hierarchical structure by determining, at least in part, how many titles and chapters the DVD has and a relationship between the titles and chapters, wherein said predefined hierarchical structure has been previously authored;
    building a blank playlist structure shell that represents the DVD's hierarchical structure;
    acquiring metadata associated with the DVD from an Internet-accessible metadata source by, at least in part, transmitting the identifier to the Internet-accessible metadata source and then receiving the metadata back from the Internet-accessible metadata source; and populating the blank playlist structure shell with the metadata by mapping the metadata into the blank playlist structure shell, wherein the metadata includes data other than title and chapter information.

21. The method of claim 20, wherein the act of building comprises defining a hierarchical structure comprising media objects that represent individual titles and any chapters that are subordinate to the individual titles.

22. The method of claim 20, wherein the act of acquiring comprises determining whether the DVD-playing device on which a user is playing the DVD has Internet access and, if not, waiting until Internet access is established and then acquiring the metadata.

23. A DVD-playing device configured to implement the method of claim 20.

24. One or more computer-readable media having computer-readable instructions thereon which, when executed by one or more computing devices, cause the computing devices to implement the method of claim 20.

25. An apparatus comprising:
a DVD navigator configured to ascertain a previously authored DVD's predefined titles and chapters when the DVD is loaded and played on a DVD-playing device; and
a user interface builder communicatively linked with the DVD navigator and configured to build a blank hierarchical playlist structure shell that represents the DVD's titles and chapters, wherein the user interface builder is further configured to communicate with a metadata source to acquire metadata and populate the hierarchical playlist structure shell with the metadata by mapping the metadata into the blank hierarchical playlist structure shell, wherein the metadata includes data other than title and chapter information.

26. The apparatus of claim 25, wherein the user interface builder builds the hierarchical playlist structure shell by representing each title and chapter as a media object.

27. The apparatus of claim 25, wherein the user interface builder builds the hierarchical playlist structure shell by representing each title and chapter as a media object and exposes a user interface that can be incorporated into a skin.

28. The apparatus of claim 25, wherein the user interface builder is configured to populate the hierarchical playlist structure shell with metadata.

29. The apparatus of claim 25, wherein the user interface builder is configured to:
communicate with a remote metadata source to acquire the metadata.

30. The apparatus of claim 25, wherein the user interface builder is configured to:
communicate with a network-accessible metadata source to acquire the metadata.

31. The apparatus of claim 25, wherein the user interface builder is configured to:
communicate with an Internet-accessible metadata source to acquire the metadata.

32. A method comprising:
rendering a DVD's video in a first area of a user interface display; and
rendering a predefined hierarchical playlist associated with the DVD's video in a second area of the user interface display during at least some of the time that the DVD's video is rendered in the first area, the playlist containing objects respectively associated with titles and chapters of the DVD and wherein the act of rendering the playlist comprises:
ascertaining the DVD's predefined hierarchical structure when the DVD is loaded and played on a DVD-playing device, wherein said predefined hierarchical structure has been previously authored;
building a blank playlist structure shell that represents the DVD's hierarchical structure;
acquiring metadata associated with the DVD, wherein the metadata includes data other than title and chapter information.
populating the blank playlist structure shell with the metadata, wherein populating comprises mapping the metadata into the blank playlist structure shell; and
rendering a playlist associated with the playlist structure.

33. The method of claim 32, wherein the act of ascertaining comprises determining how many titles and chapters the DVD has.

34. The method of claim 32, wherein the act of ascertaining comprises determining (1) how many titles and chapters the DVD has and (2) a relationship between the titles and chapters.

35. The method of claim 32, wherein:
the act of ascertaining comprises determining how many titles and chapters the DVD has; and
the act of populating comprises mapping the metadata into the playlist structure shell based on the number of DVD chapters.

36. One or more computer-readable media having computer-readable instructions thereon which, when executed by one or more computing devices, cause the computing devices to implement the method of claim 32.

37. A DVD-playing device configured to implement the method of claim 32.

38. A method comprising:
rendering a previously authored DVD's video in a first area of a user interface display when the DVD is loaded and played on a DVD-playing device;
acquiring metadata associated with and external to the DVD, wherein the metadata includes data other than title and chapter information associated with the DVD;
ascertaining a predefined hierarchical structure of the DVD;
building a blank playlist structure shell that represents the DVD's hierarchical structure;
populating the blank playlist structure shell with the metadata, wherein populating comprises mapping the metadata into the blank playlist structure shell; and
rendering the populated playlist in a second area of the user interface display during at least some of the time that the DVD's video is rendered in the first area.

39. The method of claim 38, wherein the act of acquiring comprises acquiring the metadata from a metadata source that is remote from a DVD display device on which the acts of rendering take place.

40. The method of claim 38, wherein the act of acquiring comprises determining whether a DVD display device on which the acts of rendering are being performed has network access and, if not, waiting until network access is established and then acquiring the metadata.

41. One or more computer-readable media having computer-readable instructions thereon which, when executed by one or more computing devices, cause the computing devices to implement the method of claim 38.

42. A DVD-playing device configured to implement the method of claim 38.

43. A method comprising:

rendering a previously authored DVD's video in a first area of a user interface display when the DVD is loaded and played on a DVD-playing device;

acquiring metadata associated with and external to the DVD from a network-accessible metadata source, wherein the metadata includes data other than title and chapter information associated with the DVD;

ascertaining a predefined hierarchical structure of the DVD;

building a blank playlist structure shell that represents the DVD's hierarchical structure;

populating the blank playlist structure shell with the metadata, wherein populating comprises mapping the metadata into the blank playlist structure shell; and rendering the populated playlist in a second area of the user interface display during at least some of the time that the DVD's video is rendered in the first area.

44. The method of claim 43, wherein the act of rendering the playlist takes place during at least some of the time that the DVD's video is rendered in the first area.

45. The method of claim 43, wherein the act of acquiring the metadata comprises acquiring the metadata from an Internet-accessible metadata source.

46. One or more computer-readable media having computer-readable instructions thereon which, when executed by one or more computing devices, cause the computing devices to implement the method of claim 43.

47. A DVD-playing device configured to implement the method of claim 43.

* * * * *